Patented Oct. 6, 1931

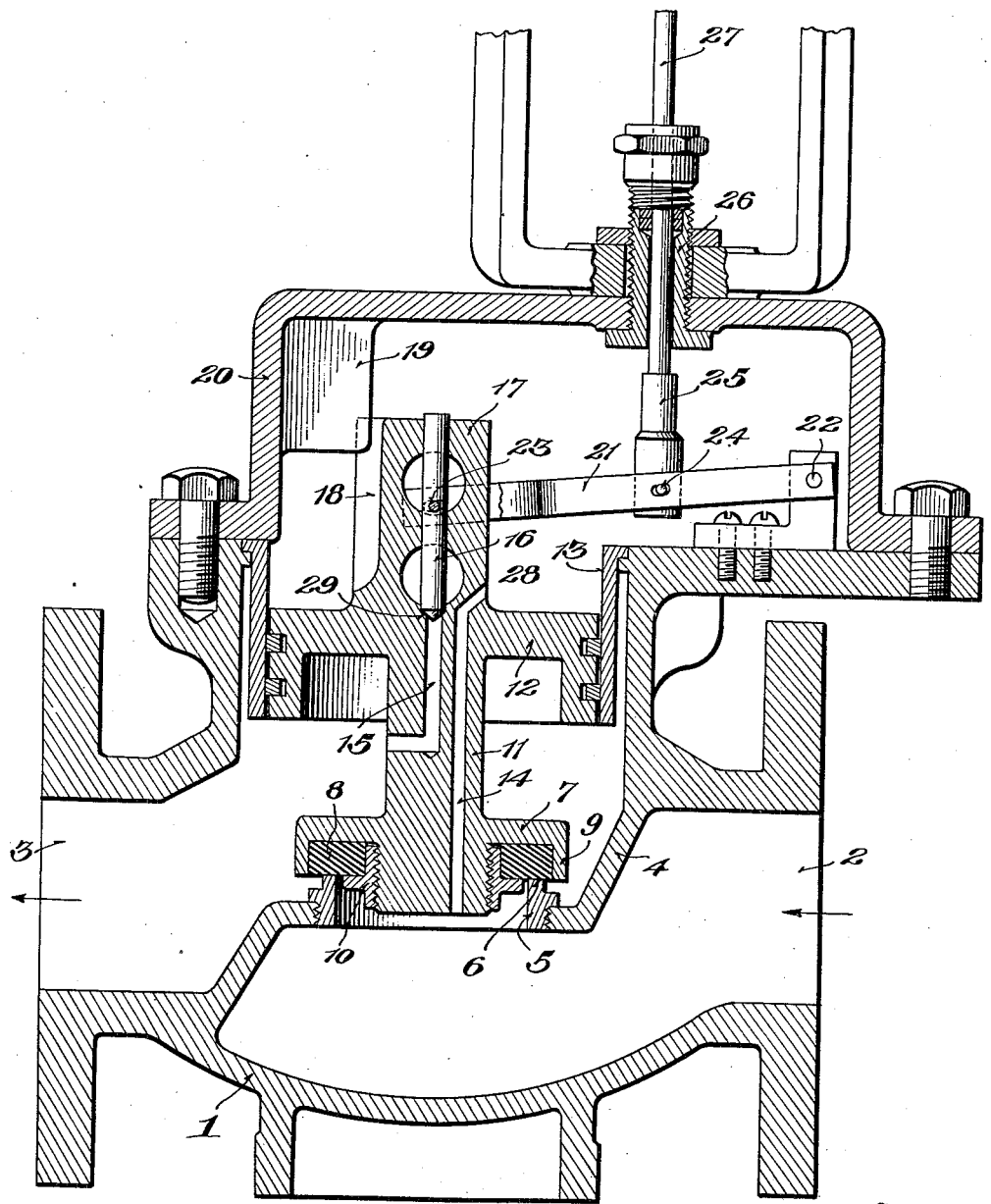

1,826,343

UNITED STATES PATENT OFFICE

WILLIAM W. CARSON, JR., OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE

PILOT CONTROLLED PISTON-OPERATED VALVE

Application filed November 29, 1926. Serial No. 151,544.

This invention relates to pilot controlled piston operated valves, particularly of the character which are primarily employed in water lines, although they are susceptible to use in lines for conveying steam, air and other fluids.

Various constructions of pilot controlled piston operated valves have heretofore been suggested including the use of slide valves as well as seating valves as the pilot, but devices of this character heretofore proposed have been open to more or less grave objections including the tendency to create water hammer, the complexity of the valve mechanism, the necessity for moving the pilot valve in the opposite direction to the desired movement of the main valve, etc.

It is an object of this invention to provide an improved pilot controlled piston operated valve whereby the movement of a valve through a relatively long stroke and requiring the exertion of a relatively large force can be effected by the movement of an element through a relatively short distance and by the exertion of a relatively small force.

Another object of this invention is to provide a device of the character described which eliminates hammering of the valve.

Another object of this invention is to provide an improved device of the character described wherein movement of the main valve in either direction is effected by the movement of the pilot valve in the same direction.

Another object of this invention is to provide a device of the character described which is simple in construction, strong and durable in operation and efficient in service.

Other objects will appear as the description of the invention proceeds.

The invention is capable of receiving a variety of mechanical expressions, one of which is shown on the accompanying drawing, but it is to be expressly understood that the drawing is for purposes of illustration only and is not to be construed as a definition of the limits of the invention, reference being had to the appended claims for that purpose.

The drawing shows an axial section, partly in elevation, of an embodiment of the present invention.

In the form shown, 1 is a valve casing of any suitable size, construction and material and provided with a suitable inlet opening 2 and a suitable outlet opening 3. Within the valve casing 1 is a partition 4 provided with a valve port 5 of any suitable size and valve seat 6 of any suitable character. Mounted for cooperation with said valve seat 6 is a valve member 7, shown as provided with an annulus of suitable seating material 8 retained within the flange 9 of the valve member 7 in any suitable way as by the nut 10. The valve mechanism so far described is of well known construction and it is to be expressly understood that the same has been illustrated as typical of any suitable valve mechanism for controlling the flow of water, steam, air, etc.

Valve member 7 is suitably connected as by the stem 11, which may be integral therewith or suitably attached thereto, with a piston 12 of any suitable construction and size, but preferably having an effective area substantially larger than the area of the valve port 5, preferably two or three times larger. The piston 12 is mounted for fluid-tight reciprocation within a cylinder 13 provided in any suitable way in the valve casing 1. The combined valve member and piston are provided with a passage 14 extending from the under or pressure side of the valve disk 7 to the upper or remote side of the piston 12, and also with a second passage 15 of larger transverse area leading from the last named side of the piston 12 to the low pressure side of the valve member.

Mounted for cooperation with the passage 15 is a pilot controlled valve member 16 of any suitable construction, preferably a seating valve which controls the inlet to said passage 15. In the form shown, pilot valve member 16 is mounted for reciprocatory movement in an axial extension 17 of the piston 12. In order to restrict said piston to rectilinear movement, and thereby prevent rotation of the piston around its axis, said extension 17 is shown as grooved at 18 for cooperation with a projection 19 on the bonnet or cover 20 of the valve casing, although any other suitable construction and arrangement may be employed for restricting the piston to rectilinear movement.

Operating means of any suitable character are connected with the pilot valve 16. In the form shown, a lever 21 is pivotally mounted at 22 on the valve casing and extends into a slot in the piston extension 17 where it is pivotally connected to the pivot valve member 16 at 23. Pivotally connected to the lever 21 at 24 is an operating stem 25 which projects through the bonnet or cover 20 where a gland 26 of any suitable character may be provided. Any suitable source of power, such as a thermostat, may be operatively connected to the exteriorly projecting end 27 of the stem 25. In the form shown, the relation of the fulcrum of lever 21 to the pivot of the stem 25 is such that the pilot valve is moved toward closing position by an inward movement of the stem 25, but it is apparent that by reversing the positions of the fulcrum 22 and the pivotal connection 24 the pilot valve 16 may be moved toward closing position by an outward movement of the stem 25, and thereby the invention be applied to the various forms of controlling devices and various kinds of services; for example, the arrangement illustrated will be suitable in a thermostatic control of a heating medium where expansion of the thermostat should move the pilot valve toward closing position, whereas the reversed relation of the pivots 22 and 24 would be suitable for the thermostatic control of a cooling medium where contraction of the thermostat should move the pilot valve toward closing position.

In operation, assuming that the main valve is closed and the pilot valve is also closed, fluid pressure enters through the inlet 2 and exerts an upward pressure on the main valve equal to the area of the port 5 times the unit pressure of the fluid. The fluid also flows through the passage 14 into the chamber 28 at the remote side of the piston 12 and exerts a downward pressure on the piston equal to the area of said piston times the unit pressure of the fluid. As the area of the piston is substantially greater than the area of the valve port, the main valve is held tightly to its seat. If stem 25 be now moved outwardly the pilot valve 16 will be moved in the same direction by an amount corresponding to the ratio of the arms of the lever 21 and the passage 15 will thereby be opened. The fluid will therefore flow out through the passage 15 to the low pressure side of the main valve, and as said passage is of greater cross section than the passage 14 the outflow will be greater than the inflow, and therefore the pressure in the chamber 28 will drop until the total pressure is less than the pressure acting upwardly on the main valve through the port 5. Main valve 7 will therefore be forced upwardly by the excess pressure acting on its lower face and the seat 29 of the pilot valve will approach pilot valve member 16 constricting the outflow through the passage 15. When the constriction of the passage 15 is such that an equilibrium of forces is effected, that is when the sum of the inlet pressure acting upwardly on the main valve 7 and the outlet pressure acting upwardly on the piston 12 is equal to the sum of the outlet pressure acting downwardly on the main valve 7 and the pressure in the chamber 28 (as existing by reason of the inflow through the passage 14 and the outflow through the constricted or throttled passage 15) acting downwardly on the piston 12, the parts will remain at rest and continue in this position as long as the pilot valve 16 is left in its adjusted position and the pressure of the fluid under control remains constant. If the pilot valve 16 is moved a further distance in the upward direction as shown, the main valve will be open a further distance until a new equilibrium is established. If, on the other hand, the pilot valve is moved toward its seat 29 so as to further constrict the outflow in the passage 15 a pressure will build up in the chamber 28 and move the main valve 7 toward its seat until a new equilibrium of forces is established, and this action will be repeated for each incremental movement of the pilot valve to or from its seat.

It will therefore be perceived that the main valve 7 follows or has movement in the same direction as the pilot valve 16 and the extent of movement of the main valve is approximately equal to that of the movement of the pilot valve while, in the form shown, it is approximately double the movement of the pilot-operating member 27. As the pressure of the fluid is acting upwardly on the main valve any danger of water hammer is limited. As the pressure required to move the stem 25 in either direction is relatively small the main valve may be controlled by the exertion of a pressure which is only a small fraction of that which would be necessary if the pressure had to be applied directly to said main valve. It will also be perceived that the device is simple and rugged in construction and inexpensive to manufacture.

While the embodiment of the invention illustrated on the drawing has been described with considerable particularity, it is to be expressly understood that the invention is not restricted thereto as the same is capable of receiving a variety of mechanical expressions, some of which will now readily suggest themselves to those skilled in the art, while changes may be made in the details of construction, arrangement and proportion of parts without departing from the spirit of the present invention. Reference is therefore to be had to the claims appended for a definition of the limits of the invention.

What is claimed is:

1. In a pilot-controlled piston-operated valve, in combination with a valve casing providing a valve port and having inlet and outlet openings and a valve member adapted to cooperate with said port, a piston operatively connected to said valve member, a passage leading from the pressure side of said valve member to the remote side of said piston, a passage of greater cross section leading from said last-named side of said piston to the low pressure side of said valve member, a pilot valve cooperating with said last-named passage, said pilot valve being wholly mounted on and guided by said piston for movement independently of said valve member and piston, and means for variably positioning said pilot valve with respect to said last mentioned passage.

2. In a pilot-controlled piston-operated valve, in combination with a valve casing providing a valve port and having inlet and outlet openings and a valve member adapted to cooperate with said port and to seat against the pressure of the fluid flowing through said port, a piston operatively connected to said valve member, a passage leading from the high pressure side of said valve member to the remote side of said piston, a passage of greater cross section leading from said last-named side of said piston to the low pressure side of said valve member, a rectilinearly movable pilot valve reciprocatingly mounted in and guided only by said piston and cooperating with said last-named passage at its inlet.

3. In a pilot-controlled piston-operated valve, in combination with a valve casing providing a valve port and having inlet and outlet openings and a valve member adapted to cooperate with said port, a piston operatively connected to said valve member, a constantly open passage leading from the high pressure side of said valve member to the remote side of said piston, a passage of greater cross section leading from the last-named side of said piston to the low pressure side of said valve member, a pilot valve for controlling said last-named passage, an extension on said piston in which said pilot valve is guided and means for variably positioning said pilot valve in said extension, said pilot valve being movable independently of said piston for adjusting the position of said valve member toward or away from its seat.

4. In a pilot-controlled piston-operated valve, in combination with a valve casing providing a valve port and having inlet and outlet openings and a valve member adapted to cooperate with said port and to seat against the pressure of the fluid flowing through said port, a piston of larger area than said port operatively connected to said valve member, a passage leading from the high pressure side of said valve member to the remote side of said piston, a passage of greater cross section leading from said last-named side of the piston to the low pressure side of said valve member, a pilot valve mounted in said piston and cooperating with said last-named passage, and means for variably positioning said pilot valve relative to its seat, said pilot valve being movable in the same direction as the desired movement of the main valve.

5. In a pilot-controlled piston-operated valve, in combination with a valve casing providing a valve port and having inlet and outlet openings and a valve member adapted to cooperate with said port, a piston of larger area than said port operatively connected to said valve member, a passage leading from the high pressure side of said valve member to the remote side of said piston, a passage of greater cross section leading from the last-named side of said piston to the low pressure side of said valve member, a pilot valve cooperating with said last-named passage, said pilot valve being mounted within an elongated recess in said piston, a lever operatively connected to said pilot valve, and means pivotally connected to said lever for operating said pilot valve, said pilot valve being movable independently of the motion of said valve member and piston and variably positionable with respect thereto.

6. In a pilot-controlled piston-operated valve, in combination with a valve casing providing a valve port and having inlet and outlet openings and a valve member adapted to cooperate with said port, a piston of larger area than said valve member and operatively connected to said valve member, a passage leading from the high pressure side of said valve member to the remote side of said piston, a passage of greater cross section leading from the last-named side of said piston to the low pressure side of said valve member, a pilot valve movable independently of the motion of said piston and valve member and cooperating with said last-named passage, means for preventing rotation of said piston and pilot valve, and means for operating said pilot valve.

7. In a pilot-controlled piston-operated valve, in combination with a valve casing providing a valve port and having inlet and outlet openings and a valve member adapted to cooperate with said port, a piston of larger area than said valve member and operatively connected to said valve member, means forming a chamber at that side of the piston remote from the valve member, passages extending through said valve member and piston communicating with said chamber and the high and the low pressure sides of said valve member and constituting inlet and outlet passages for said chamber, the outlet passage from said chamber being of greater cross section than the inlet passage to said chamber, a pilot valve cooperating with said outlet passage and carried entirely by said piston, a lever mounted in said chamber and connected to said pilot valve, and means connected to said lever for variably positioning said pilot valve with respect to said outlet passage.

In testimony whereof I have signed this specification.

WILLIAM W. CARSON, Jr.